Patented Oct. 11, 1932

1,881,445

UNITED STATES PATENT OFFICE

JOSEPH A. FLANZER AND EMIL REISMAN, OF BROOKLYN, NEW YORK, ASSIGNORS TO TECHNIDYNE CORPORATION, OF NEW YORK, N. Y., A CORPORATION OF NEW YORK

RESISTANCE

No Drawing.  Application filed September 18, 1929. Serial No. 393,573.

This invention relates to resistances, and more particularly to capacity and inductance free resistances made by painting a resistance film on an insulation base, and to a resistance paint for the same.

In a copending application of Lester L. Jones and Joseph Flanzer, Ser. No. 61,326, filed October 8, 1925, since issued as Patent No. 1,762,990 on June 10, 1930, there is disclosed a resistance paint adapted for use on insulation bases such as glass, mica, porcelain, isolantite, and the like, to form resistance elements. This paint, while possessing advantageous characteristics, was found to be hygroscopic, resulting in changes in resistance caused by absorption of moisture.

In a copending application of Lester L. Jones, Alois Schmidt, and Joseph Jones, Ser. No. 167,583, filed Feb. 11, 1927, since issued as Patent No. 1,773,105 on August 19, 1930, there is disclosed an improved resistance paint or coating material which may similarly be painted on glass, mica, porcelain, isolantite, and other bases, and which in addition is substantially non-hygroscopic, so that resistance elements made with this improved resistance paint need not be sealed in tubes or otherwise protected from moisture.

Our invention relates to an improvement in the formula for making such a resistance paint, and the primary object of our invention is to produce a resistance paint which will have superior mechanical, electrical, and moisture resisting qualities.

To the accomplishment of the foregoing and such other objects as may hereinafter appear our invention consists in the paint, and the resistance units employing the same, as hereinafter are more particularly described and sought to be defined in the claims.

Our new resistance paint, like the prior paint, employs a resistance material, preferably colloidal graphite, which is held in a binder including a metallic phosphate, but we have found that nickel phosphate is superior to the aluminum phosphate previously employed.

The nickel phosphate is preferably obtained by the reaction of nickel carbonate with phosphoric acid. The phosphoric acid is used in excess so as to keep the nickel phosphate in solution, and so that the vehicle of the paint will include phosphoric acid, for this increases the mechanical tenacity and the cohesiveness and, in the optimum relation, decreases moisture absorption in the resistance film obtained from the paint. The colloidal graphite may suitably be used in aqueous solution, and the paint may be made by mixing the said solution with the nickel phosphate and phosphoric acid vehicle.

Specifically, we recommend and find best the following formula for the manufacture of the resistance paint. The vehicle is made by mixing phosphoric acid, nickel carbonate and water in the proportion of 14 cc of phosphoric acid to 9.7 grams of nickel carbonate and 86 cc of water. The nickel carbonate is added in small quantities to the mixture of phosphoric acid in water, with constant stirring until complete solution has taken place. The colloidal solution of graphite preferably consists of natural amorphous graphite (crystalline graphite, as produced in electric furnaces, seems unsatisfactory) in a colloidal state in aqueous solution, and may, for example, be in the proportion of 77.5% of water to 22.5% graphite by weight, as in the aqueous solution of graphite known commercially as Kollag. The vehicle and the colloidal solution are mixed in the proportion of 15 cc of vehicle to 10 cc of the Kollag.

Considerable variation in the proportion of acid to water is possible when making the vehicle, and we have found, for example, that an effective vehicle may be made even when using twice the ratio of water indicated above, and that the water may also readily be reduced from 86 cc to 61 cc, but that much further reduction makes a long period of time necessary for air drying of the resulting paint before baking the same. The allowable variation in the proportions of phosphoric acid and nickel carbonate is not nearly so wide. A departure of more than 10% from the proportions given above we find tends to lead to a noticeable reduction in the efficiency of the vehicle with respect to its binding and self-compacting properties, and also with respect to the moisture absorption properties and the constancy of the resistance under variable atmospheric conditions. If the formula is considerably further departed from the paint will be very susceptible to humidity changes, and may also become so soft that it may be wiped off the insulation base to which it has been applied. The proportion of graphite in the aqueous solution may be varied widely, this merely amounting to a variation in the water content of the paint, which has already been indicated as permissible, provided that the proportion of graphite is kept the same. A denser graphite solution may be diluted before being used, or an appropriately reduced amount may be used. The proportion of the graphite solution to vehicle may be widely varied when this change represents merely a change in the water content, for the water is finally baked out, and only graphite, nickel phosphate, and phosphoric acid remain, and the relation of these ingredients is the important thing, except, of course, that the water content, while not critical, must be kept within limits so as to obtain a convenient fluidity of the paint. Assuming the graphite solution to be Kollag, or to be in the ratio above specified, a variation in the proportion thereof to vehicle affects the density of the paint, and the thinness, and therefore the ohmic resistance of the film obtained when the paint is applied. This variation cannot be carried too far because it finally will affect the mechanical and hygroscopic properties of the resistance unit obtained, but the proportion of vehicle may be reduced by about 50% and may be increased by about 33%, that is to say, for 10 cc of Kollag the vehicle may be varied from about 7 to 20 cc and still result in a usable paint.

To make resistance units embodying the foregoing resistance paint it is merely necessary to apply the paint by brushing over or otherwise applying the paint to any suitable non-porous insulation base such as glass, mica, enamel, porcelain, isolantite, and the like. The insulation base should not be slightly porous because with a slightly porous base colloidal graphite will be filtered from the vehicle, that is, the base will absorb some vehicle but will not admit the graphite, and the latter will remain on the surface with a reduced amount of vehicle, and therefore with an inefficient bond. The painted resistance units should be thoroughly air dried, after which they should be baked for a half hour at 550 degrees C. The baking temperature may vary between 500 degrees to 600 degrees C. without inferior results.

We have found that an excess of phosphoric acid over and above that desired may be removed by increased baking. For this purpose it is desirable to raise the baking temperature as well as to increase the baking time because at a low baking temperature the necessary time to get rid of excessive phosphoric acid is apt to be too great. Suppose, for example, that a 5% increase in phosphoric acid was used at the time of mixing the vehicle. With the normal baking process the resistance units will be inferior and have a change in resistance due to moisture of say 7%. The 5% excess phosphoric acid may be removed and the resistance units brought to normal by appropriately baking them. This cannot be done at a baking temperature below 550 degrees, and even at a temperature of 550 degrees baking will be necessary for an hour or two. At 600 degrees only a quarter to a half hour of baking will be needed. At 700 degrees 5 minutes will probably suffice, but it is not well to use this high baking temperature because the time of baking becomes critical in the sense that a few minutes error in baking causes a large percentage error in the total baking time. In general, we find that this entire baking process to get rid of excessive phosphoric acid is not as critical as might be expected because of the fact that as the phosphoric acid is reduced to the proper desired amount it seems to reach a more difficult evaporation level, so that it is much more difficult to bake off the wanted phosphoric acid. Of course, it goes without saying that it is far simpler and preferable to mix the paint with the proper amount of phosphoric acid in the first place than to rely upon baking to adjust this amount subsequently.

After the units have been baked we prefer to boil them in clean water for about 15 minutes in order to accelerate the absorption of the normal moisture content. The units are then preferably left to stand for about 24 hours in order to permit of evaporation of the excess moisture taken on during the boiling of the units. It may be better not to accelerate the moisture absorption in the case of resistance units having a slightly porous base, leading to improperly bonded graphite, as was before mentioned. This, however, is really due to the fact that a paint having an incorrect effective formula is being dealt with, rather than because boiling per se is undesirable.

It may be well to point out, particularly in connection with isolantite, that while the base should not be slightly porous, neither is it well to have too smooth a finish, for then the resistance film, while otherwise satisfactory, may be too easily scraped or peeled from the base. The blank, therefore, while non-porous, may be rough, preferably to a degree like etched or sand blasted glass.

An indication of how a resistance unit will behave under variations in the relative humidity of the atmosphere may be obtained in accordance with the teachings of Joseph Flanzer in the aforesaid application by measuring the rise in resistance of the resistance units due to boiling. The rise in resistance due to boiling is defined as the change in resistance of a resistance unit between the time when it is first taken from the baking oven and allowed to cool to room temperature and the time when it has been boiled in water for a given period of say 15 minutes and allowed to cool to room temperature. Those units which show the least change between these conditions may be anticipated to be, and experience shows them to be units having the most constant resistance when subjected to changes in relative humidity.

The rise in resistance of a paint manufactured in accordance with our formula is about 3 to 4 percent. This does not mean that any such change will ever occur due to variations in relative humidity, for the moisture absorbed by the paint during boiling can be driven out only under very high temperatures. The boiling, followed by a drying period of about 24 hours to permit the excess moisture to evaporate, stabilizes the resistance units by accelerating the absorption of their normal moisture contect, and daily moisture changes thereafter merely cause a very slight variation in this moisture content. Resistance units made with our paint show variations in resistance which do not exceed 2/3 of a percent after the units have been stabilized.

This is a great improvement over the aluminum phosphate paint previously employed, the latter showing a rise in resistance of about 12 percent due to boiling, and variations in resistance of about 2 to 3 percent due to changes in relative humidity.

Our new paint also has the advantage of being mechanically tougher and less subject to abrasion than the paint formerly employed, while retaining the ease of application and the other advantageous properties of the prior paint.

The manner of making our resistance paint, and of applying the same to the manufacture of resistance units, and the many advantages of the same, will for the most part be apparent from the foregoing description. While we have described our paint in a preferred form it will be apparent that modifications and changes may be made therein, paticularly within the limits previously discussed, without departing from the spirit of the invention, defined in the following claims.

We claim:

1. A resistance paint comprising finely divided resistance material suspended in a vehicle including nickel phosphate.

2. A resistance paint comprising collodial graphite suspended in a vehicle including nickel phosphate.

3. A resistance paint comprising finely divided carbon suspended in a vehicle including nickel phosphate and phosphoric acid.

4. A resistance paint comprising colloidal graphite suspended in a vehicle including nickel phosphate and phosphoric acid.

5. A resistance paint comprising finely divided resistance material held in suspension in a vehicle comprising phosphoric acid, nickel carbonate, and water.

6. A resistance paint comprising colloidal graphite held in suspension in a vehicle comprising phosphoric acid, nickel carbonate, and water.

7. A resistance paint comprising finely divided carbon held in suspension in a vehicle comprising 14 cc of phosphoric acid, 9.7 grams of nickel carbonate, and water.

8. A resistance paint comprising colloidal graphite held in suspension in a vehicle comprising 14 cc of phosphoric acid, 9.7 grams of nickel carbonate, and water.

9. A resistance paint comprising colloidal amorphous graphite held in suspension in a vehicle comprising 14 cc of phosphoric acid, 9.7 grams of nickel carbonate, and 86 cc of water.

10. A resistance paint comprising an aqueous solution of about 22.5% of colloidal graphite to 77.5% of water by weight, mixed with a vehicle comprising 14 cc of phosphoric acid, 9.7 grams of nickel carbonate, and 86 cc of water, the graphite solution and the vehicle being mixed in the proportion of 10 cc of solution to 15 cc of vehicle.

11. An electrical resistance unit comprising an insulation base coated with a resistance film including finely divided resistance material and nickel phosphate.

12. An electrical resistance unit comprising an insulation base coated with a resistance film including colloidal graphite and nickel phosphate.

13. An electrical resistance unit comprising an insulation base coated with a resistance film including a finely divided carbon held in a binder of nickel phosphate and prosphoric acid.

14. An electrical resistance unit comprising an insulation base coated with a resistance film including colloidal graphite held in a binder of nickel phosphate and phosphoric acid.

15. In the manufacture of resistance units, the method which includes mixing phosphoric acid with water and adding nickel carbonate in small quantities to the mixture of phosphoric acid in water and stirring until complete solution takes place in order to form a binding vehicle, and thereafter mixing the aforesaid vehicle with an aqueous solution of colloidal graphite in order to form a resistance paint.

16. In the manufacture of resistance units, the method which includes mixing phosphoric acid with water and adding nickel carbonate in small quantities to the mixture of phosphoric acid in water and stirring until complete solution takes place in order to form a binding vehicle, mixing the aforesaid vehicle with an aqueous solution of colloidal graphite, painting the resulting resistance paint on an insulation base, and thereafter baking the painted unit.

17. In the manufacture of resistance units, the method which includes mixing about 14 cc of phosphoric acid with 86 cc of water and adding about 9.7 grams of nickel carbonate in small quantities to the mixture of phosphoric acid in water with constant stirring until complete solution takes place in order to form a binding vehicle, and thereafter mixing the aforesaid vehicle with an aqueous solution comprising approximately 22.5% of colloidal graphite to 77.5% of water by weight, the vehicle and colloidal solution being mixed in the proportion of 15 cc of vehicle to 10 cc of the colloidal solution.

18. In the manufacture of resistance units, the method which includes mixing about 14 cc of phosphoric acid with 86 cc of water and adding about 9.7 grams of nickel carbonate in small quantities to the mixture of phosphoric acid in water with constant stirring until complete solution takes place in order to form a binding vehicle, mixing the aforesaid vehicle with an equeous solution comprising approximately 22.5% of colloidal graphite to 77.5% of water by weight, the vehicle and colloidal solution being mixed in the proportion of 15 cc of vehicle to 10 cc of the colloidal solution, painting the resulting resistance paint on an insulation base, air-drying the painted unit, thereafter baking the same at a temperature between 500 and 600 degrees C. for about a half hour, boiling the baked unit in water for about fifteen minutes in order to accelerate the absorption of moisture, and finally air-drying the boiled unit.

Signed at New York in the county of New York and State of New York this 16th day of September A. D., 1929.

JOSEPH A. FLANZER.
EMIL REISMAN.